United States Patent Office 2,888,475
Patented May 26, 1959

2,888,475
TITANATED ALKOXY SILANES

Edwin P. Plueddemann, Toledo, Ohio, assignor, by mesne assignments, to Allied Chemical Corporation, a corporation of New York No Drawing. Application March 4, 1953
Serial No. 340,379

10 Claims. (Cl. 260—429.5)

The invention relates to novel silyl titanates and to an economical method for the production thereof.

Alkyl orthotitanates have been reported to be very efficient water-proofing agents for textiles. It has been reported also that such titanates can be reacted with organosilanols such as silicone resins. However, such titanates are quite expensive to produce and, therefore, are not readily available.

The principal object of the invention is the production of novel silyl titanates by a novel, economical method that employs inexpensive starting materials. More specific objects and advantages are apparent from the description, which illustrates and discloses but is not intended to limit the invention.

In the present method, titanates are produced by reacting (1) a substance whose molecule contains an aliphatic hydrocarbon group connected to a silicon atom through an oxygen linkage with (2) a titanium salt of an acid of the class consisting of hydrochloric acid, hydrobromic acid and saturated fatty acids having from one to four carbon atoms.

The present invention is based upon the discovery that a titanium salt such as titanium tetrachloride reacts metathetically with a substance whose molecule contains an aliphatic hydrocarbon group connected to a silicon atom through an oxygen linkage, such as an alkoxysilane.

An important advantage of the present method is that it employs an inexpensive and readily available titanium salt such as titanium tetrachloride. Another important advantage of the present method is that it employs a substance such as an alkoxysilane, rather than an organosilanol, so that the reaction is more controllable. An organosilanol, containing hydroxy groups connected to silicon atoms, tends to form water by condensation of such hydroxy groups, the water in turn causing hydrolysis and condensation of titanium compounds, so that the degree of reaction of the titanium compounds with the silicon compounds is not readily controllable because of the large amount of separate condensation of the silicon compounds and separate condensation of the titanium compounds.

SILANE STARTING MATERIAL

Silyl titanates are produced in accordance with the present method by reacting a titanium salt, as hereinafter defined, with a substance whose molecule contains an aliphatic hydrocarbon group connected to a silicon atom through an oxygen linkage. The latter substance may be (1) a silane having the general formula $$H_wR_xSiOr_{(4-(x+w))}$$

or (2) a silane having the general formula

or

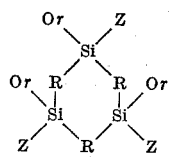

or mixtures of such silanes, or (3) an organosiloxane having the empirical formula $$RSi(Or)_mO_{\left(\frac{3-m}{2}\right)}$$

wherein the groups R are hydrocarbon groups having from one to eighteen carbon atoms, the groups r are aliphatic hydrocarbon groups having from one to eighteen carbon atoms, w is zero or 1, x is zero or an integer from one to three, the sum of x+w is not greater than 3, z is an integer from one to two, Z is a monovalent group of the same class as R or Or, and m is a number from ⅓ to 2.

An organic group R, which is connected to a silicon atom through a carbon-silicon bond in a substance as defined in (1), (2) or (3) above, is a monovalent organic group, or a divalent organic group connecting two silicon atoms.

A monovalent hydrocarbon group R may be a monovalent aliphatic hydrocarbon group having from one to eighteen carbon atoms or a monovalent aromatic hydrocarbon group having from six to eighteen carbon atoms. The term "aliphatic hydrocarbon group" is used herein to mean a straight, branched or closed chain primary, secondary or tertiary aliphatic hydrocarbon group having saturated or unsaturated

bonds and having from one to eighteen carbon atoms i.e., a methyl, ethyl, 1-propyl, isopropyl, 1-butyl, isobutyl, 2-butyl or tertiary butyl group, or any primary, secondary or tertiary alkyl group having from five to eighteen carbon atoms; or any alkenyl group having from two to eighteen carbon atoms and having not more than one olefinic double bond; or any cycloalkyl group which consists of a single cycloaliphatic nucleus containing from five to six carbon atoms and having not more than three side chains containing a total of not more than six carbon atoms, such as cyclopentyl, cyclohexyl, or an alkyl-substituted cyclopentyl or cyclohexyl group in which the alkyl side chains are one, two or three in number, and not more than one side chain is bonded to any one nuclear carbon atom, each alkyl side chain may be a primary, secondary or tertiary alkyl group having from one to six carbon atoms, as hereinbefore described.

The term "aromatic hydrocarbon group having from six to eighteen carbon atoms" is used herein to mean (a) an aryl group which consists of from one to three benzene nuclei having not more than five side chains (which may be primary, secondary or tertiary alkyl groups having from one to six carbon atoms, the total number of nuclear and side chain carbon atoms being not more than eighteen) such as groups of the benzene, naphthalene, diphenyl or terphenyl series, or (b) an aralkyl group which consists of any aliphatic hydrocarbon group hereinbefore described, having from one to twelve carbon atoms, in which one hydrogen atom has been replaced by an aryl group, as hereinbefore described, the total number of carbon atoms in the aralkyl group being not more than eighteen, such as a benzyl, a beta-phenylethyl, a beta-tolylethyl or a beta-phenylpropyl group.

A divalent organic group R connecting two silicon atoms may be (a) a divalent aliphatic hydrocarbon group which can be considered to be derived by the removal of two hydrogen atoms from the molecule of a straight or branched chain, saturated aliphatic hydrocarbon having from one to eighteen carbon atoms or from the molecule of a closed chain saturated aliphatic hydrocarbon having from five to eighteen carbon atoms (i.e., the divalent aliphatic group may be methylene, ethylene, trimethylene, propylene, any butylene, or any alkylene group having from five to eighteen carbon atoms, e.g., any polymethylene group from pentamethylene to octadecamethylene, cyclopentylene, cyclohexylene, or an alkylcyclopentylene or alkylcyclohexylene group in which the alkyl groups attached to each ring have from one to six carbon atoms, have straight or branched chains, and are from one to two in number; or (b) a divalent aromatic group having from six to eighteen carbon atoms that can be considered to be derived by the removal of two hydrogen atoms from the molecule of an aromatic hydrocarbon (e.g., the divalent aromatic group may be phenylene, tolylene or any xylylene radical), or from the aliphatic portion of an alkyl-substituted aromatic hydrocarbon (e.g., the divalent aromatic group may be a phenylmethylene group).

In the above general formulas an aliphatic hydrocarbon group, $r$, that is connected to a silicon atom through an oxygen linkage is of the same class as a monovalent aliphatic hydrocarbon group R, as hereinbefore defined.

For the sake of brevity, a substance as defined by the general formulas (1), (2) and (3) above is hereinafter referred to as a silane starting material. In the general formula for a silane starting material as defined in (1), it is preferable that $x$ be at least one (i.e., that there be at least one organic group attached to each silicon atom through a carbon-silicon bond). It is preferable also that $r$ have from one to four carbon atoms, since longer hydrocarbon groups attached to a silicon atom by oxygen linkage are less reactive with a titanium salt in the present method. Preferably $r$ in the formula for a silane starting material has from one to two carbon atoms.

Silane starting materials as defined above include: methyl orthosilicate, ethyl orthosilicate, propyl orthosilicate, butyl orthosilicate, triethoxysilane, ethyltriethoxysilane, diethyldiethoxysilane, ethyldiethoxysilane, ethyltrimethoxysilane, ethyltri-n-propoxysilane, ethyltri-n-butoxysilane, ethyltri-i-butoxysilane, ethyltri-n-pentoxysilane, n-propyltriethoxysilane, isobutyltriethoxy-silane, vinyltriethoxysilane, allyltriethoxysilane, n-hexyltriethoxysilane, phenyltriethoxysilane, phenyltri-n-propoxysilane, phenyltri-i-pentoxysilane, cyclohexyltributoxysilane, cyclohexyltrioctyloxysilane and organosiloxanes such as diphenyltetraethoxydisiloxane, butylbutoxysiloxanes, ethylbutoxysiloxanes, sec. butylbutoxysiloxanes and butyl-2-pentoxysiloxanes. (The preceding nomenclature for organosiloxanes which may be used in the practice of the invention does not, of course, identify the actual molecular structure of the compounds, but only serves to identify the starting materials from which they are derived, as hereinafter further discussed.)

Silane starting materials as defined in (3) above (i.e., organosiloxanes) may be prepared by reacting an alcohol and water simultaneously with an organotrihalosilane. When a mixture of an alcohol and water in which the quantity of water is less than 1½ mols is reacted with a mol of an organotrihalosilane, the halo groups that are not hydrolyzed by the insufficient quantity of water react with the alcohol (one molecule of the alcohol reacts with one halo group) with the evolution of a hydrogen halide. The product so obtained is an organoalkoxysiloxane, whose molecular structure is predominantly a chain, a ring, or a chain of rings, depending upon the proportions of water and alcohol employed. The proportion of water in a mixture of water and an alcohol that is reacted with an organotrihalosilane may be from ½ to 1⅓ mols per mol of silane, and the proportion of the alcohol should be at least sufficient to react with the halo groups that are not hydrolyzed by the water. Thus, the oxygen atoms which connect the silicon atoms in the molecular structure of the organoalkoxysiloxane that is obtained are derived from the hydrolysis of part of the halo groups in the trihalosilane starting material, and average from ½ to 1⅓ per silicon atom, depending upon the amount of water that is reacted per mol of trihalosilane. Similarly, the alkoxy groups that are connected to the silicon atoms are derived from the reaction of the alcohol with the halo groups in the trihalosilane starting material that are not hydrolyzed by the water, and average from ⅓ to 2 per silicon atom (i.e., $m$ is from ⅓ to 2 in the empirical formula given above) depending upon the amount of water that is reacted per mol of silane.

When $m$ in the empirical formula is less than 1, the molecules of the organosiloxane are believed to consist of rings and chains of rings, the group

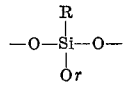

being present both in the rings and in chains connecting the rings. As $m$ decreases and approaches ⅓, the molecular structure is believed to comprise predominantly chains of rings as represented by the following structure (along with some chains of larger rings):

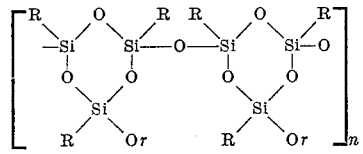

Ordinarily it is preferable to use the alcohol in an excess over the theoretical amount required to produce the desired organosiloxane, since the halo groups are less reactive with the alcohol than with the water. Although any desired excess of the alcohol over the theoretical amount, e.g., from approximately 25 percent to approximately 100 percent, may be employed, it is ordinarily desirable to use about a 50 percent excess over the theoretical amount of the alcohol.

A mixture of the alcohol and the water is usually added to a solution of the organotrihalosilane. The rate of addition of the alcohol-water mixture is limited only by the vigor with which the substances react, and so long as hydrogen chloride is not evolved explosively, it may be as rapid as possible. Although the reaction starts readily at room temperature, it is desirable to reflux the mixture (until the evolution of hydrogen chloride ceases) to bring the reaction to completion as rapidly as possible.

The alcohol and the water should be present in a one-phase system so that they react simultaneously with the organotrihalosilane. When the molar ratio of water to silane is low (e.g., less than 1.2 to 1), the mixture of the alcohol and the water is ordinarily a one-phase system. With higher ratios of water to silane, it is usually desirable to add an inert solvent which is miscible with water and which is not too high boiling to be separated from the organosiloxane product by distillation, in an amount sufficient to make the alcohol-water mixture a one-phase system. Such inert solvents include: dioxane and dialkyl ether of diethylene glycol such as the diethyl and dibutyl ethers of diethylene glycol.

The alcohol-water mixture is usually added to a solution of the silane in a solvent. Although the usual solvents for such silanes may be used, e.g., hydrocarbon solvents such as benzene and toluene, it is far more desirable to use a solvent in which the hydrogen halide formed during the reaction is insoluble, so that it can be easily removed before it can exert any undesirable effect (e.g., by reacting with alkoxy groups attached to silicon atoms in the molecules of the organosiloxane). Such a solvent must be separated from the organosiloxane product by distillation, so that it should be capable of being distilled at atmospheric pressure wtihout appreciable decomposition. Carbon tetrachloride is a suitable solvent.

Since the alcohol acts as a solvent for the hydrogen halide, the volume of solvent for the silane preferably is at least equal to the volume of alcohol and may be as large as is economically feasible. Ordinarily it is desirable to use approximately 200 grams of solvent per mol of silane.

TITANIUM SALT

The titanium salt is a salt of an acid of the class consisting of hydrochloric acid, hydrobromic acid and saturated fatty acids having from one to four carbon atoms, and preferably is an ortho salt. Such titanium salts include: titanium tetrachloride, titanium tetrabromide, titanium orthoformate, titanium orthoacetate, titanium orthopropionate, and titanium orthobutyrates.

The titanium salts of saturated fatty acids having from two to four carbon atoms may be prepared by simply refluxing an anhydrous alkali metal salt of such an acid or the acid itself with titanium tetrachloride or titanium tetrabromide in a molar ratio of approximately 4 to 1. Preferably, the reaction is carried out in an organic hydrocarbon solvent such as xylene. Titanium orthoformate may be prepared by refluxing anhydrous sodium or potassium formate with titanium tetrachloride or titanium tetrabromide in a hydrocarbon solvent.

It is preferable that the titanium salt used in the practice of the invention be titanium tetrachloride.

PRODUCTION OF SILYL TITANATE

In the production of silyl titanates by the present method, at least one mol of the silane starting material should be used per mol of the titanium salt, and as much as four mols of the silane may be used per mol of the titanium salt.

When a silane starting material, as hereinbefore defined, such as an alkoxy silane, is warmed with a titanium salt, as hereinbefore defined, such as titanium tetrachloride, a metathetical reaction takes place in which an alkyl chloride is split off, leaving a silyl titanate residue. Thus, assuming complete reaction (as hereinafter further discussed), the products that can be produced by the present method include novel substances of the present invention having an average unit structure corresponding to the formula

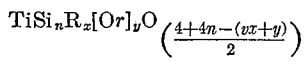

wherein $n$ is at least 1; $v$ is the average valence of the groups R; $vx$ is from 0 to $2n$; $y$ is from $n$ to $3n$; the sum of $vx$ and $y$ is not greater than $3n$; the groups R are hydrocarbon groups each connected to a silicon atom through a carbon-silicon bond; the groups $r$ are aliphatic hydrocarbon groups; at least part of the Or groups are attached to silicon atoms, and at least part of the silicon atoms are combined with titanium as titanates.

Such substances of the invention may be produced from any of the silane starting materials hereinbefore described in which there are not more than two organic groups connected to any one silicon atom by a carbon-silicon bond. Preferably, however, there is at least one organic group connected to each silicon atom by a carbon-silicon bond in the molecule of a silyl titanate of the invention, i.e., in the above general formula $x$ is at least equal to $n$. Since in the silane starting materials R may be a monovalent organic group attached to a silicon atom or a divalent group connecting two silicon atoms, $v$ in the above formula is a number from 1 to 2.

The titanates resulting from the reaction of one mol of the silane starting material per mol of the titanium salt are hard, insoluble, powdery products. It is preferable to react from three to four mols of the silane starting material permol of the titanium salt, because the titanates obtained from such a reaction are highly useful oily products as hereinafter further discussed. Furthermore, it is preferable that the silane starting material be a monomeric silane rather than a siloxane, i.e., contain no

bonds, and that such silane contain only one silicon atom per molecule. (When the silane starting material is a cross-linked silane, or an organosiloxane (preferably of low molecular weight), the proportion of silane should not be less than three or four mols per mol of the titanium salt, in order to obtain a product that is a liquid rather than a highly cross-linked gel.) It is also desirable that all of the Or groups be attached to silicon atoms so that none are attached to titanium atoms. (As hereinafter discussed, an agent such as sodium in ethyl alcohol may be used to neutralize the titanates produced by the present method. In such neutralization an alkoxy group derived from the alcohol remains attached to a titanium atom in the neutralized titanate product.)

Thus, the most desirable silyl titanates of the invention have an average unit structure corresponding to the formula

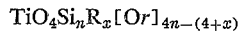

wherein $n$ is from 3 to 4; $x$ is from 0 to $n$; the groups R are monovalent hydrocarbon groups each connected to a silicon atom through a carbon-silicon bond; the groups $r$ are aliphatic hydrocarbon groups; all the Or groups are attached to silicon atoms; and at least part of the silicon atoms are combined with titanium as titanates.

As hereinbefore stated, long chain alkyl and alkoxy (and alkenyloxy) groups on silicon hinder complete reaction with the titanium salt. Yet such groups improve the water repellency of the silyl titanates. Ordinarily, it is preferably in the production of titanates having alkoxy or (alkenyloxy) groups higher than butoxy (or butenyloxy) groups (i.e., when $r$ in the above formula has more than four carbon atoms) first to produce a titanate having lower alkoxy (or alkenyloxy) groups and then to exchange these groups for higher alkoxy (or alkenyloxy) groups by reaction with the corresponding higher alcohol. This procedure permits more rapid and more complete reaction of the silane with the titanium salt.

Although the reaction to produce titanates by the present method may be carried out under superatmospheric pressure, it is preferable to carry it out at ordinary atmospheric pressure. In general, the reaction temperature may range from 100 degrees C. to 200 degrees C., but preferably the reactants are refluxed at temperatures ranging between 120 and 170 degrees C. The reaction is substantially complete when evolution of gas (e.g., the gas is ethyl chloride when titanium tetrachloride is reacted with an ethoxysilane) becomes very slow or almost ceases, usually within two to eight hours.

The preferred silyl titanates of the invention are products of the reaction of three or four mols of the silane per mol of the titanium salt. However, when the titanium salt employed in the present method is titanium tetrachloride or titanium tetrabromide, it is difficult to obtain complete reaction by merely refluxing the silane starting material and the titanium salt, so that residual chloro or bromo groups may remain attached to titanium in the molecules of silyl titanates produced by the present method. When such titanates are used to impart water repellency to textiles or paper, as hereinafter further discussed, the treated material may be attacked by the acid formed by hydrolysis of the residual chloro or bromo groups. In order to obtain complete reaction and to recover a neutral product free of hydrolyzable chloro or bromo groups (i.e., in order to obtain a titanate of the invention) it is ordinarily desirable to reflux the silane with the titanium tetrachloride or titanium tetrabromide until the evolution of gas becomes very slow, and then to titrate for residual chloro or bromo groups and to neutralize these groups. The mixture may be cooled and a neutralizing agent may be added in just sufficient amount to neutralize the residual halogen and the mixture again warmed to complete the reaction.

The neutralizing agent may be, for example, sodium in an excess of ethyl alcohol. After warming, and filtering off sodium chloride or sodium bromide, if desired, the titanate product contains ethoxy groups attached to titanium. (The excess of alcohol may be distilled off also, if desired.) Alternatively, an alkali alkoxy silicate such as sodium ethoxy silicate, equivalent to the residual chlorine or bromine, may be added to the reaction mixture and the mixture warmed to precipitate sodium chloride or sodium bromide. For example, the following equation represents the neutralization by this procedure of the product resulting from the reaction of three mols of ethyl orthosilicate with one mol of titanium tetrachloride, titration having indicated that one-fourth of the original acidity remains:

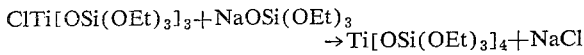

ClTi[OSi(OEt)$_3$]$_3$ + NaOSi(OEt)$_3$
→ Ti[OSi(OEt)$_3$]$_4$ + NaCl (An alkali alkoxy silicate may be prepared, for example, by simply warming an organoalkoxysilane with an anhydrous alkali metal base such as anhydrous sodium or potassium hydroxide, using about one mol of the base per mol of the organoalkoxysilane so that an alkyl group from only one of the alkoxy groups attached to a silicone atom in the alkoxysilane is replaced by an atoms of the alkali metal derived from the alkali metal hydroxide. The warming should be continued until the theoretical amount of alkyl alcohol is recovered.)

The preferred procedure for neutralizing residual chlorine or bromine in the molecules of a titanate produced by the present method consists in carrying out the present method, using an equivalent or excess of the silane and then warming the incompletely reacted silane-titanium salt mixture with anhydrous alkali metal salt or ammonium salt of a saturated fatty acid having from one to four carbon atoms (i.e., anhydrous sodium or potassium formate, acetate, propionate or butyrates). Ordinarily it is sufficient simply to warm the reaction mixture of the titanate containing residual chlorine or bromine and the alkali metal salt with stirring at a temperature of about 100 to 150 degrees C. for about one-half hour, and then to filter off the alkali metal chloride or bromide that is formed. It is believed that this reaction, using, for example, sodium acetate (which is particularly convenient and relatively inexpensive to use) proceeds in two steps:

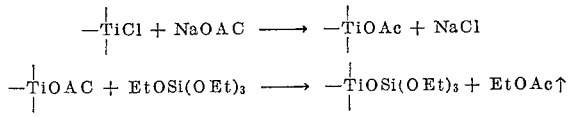

—TiCl + NaOAc ⟶ —TiOAc + NaCl

—TiOAc + EtOSi(OEt)$_3$ ⟶ —TiOSi(OEt)$_3$ + EtOAc↑

The volatile ethyl acetate can be removed easily as it is formed. (Titanium acetate must be formed as an intermediate step, because sodium acetate does not react with ethyl silicate alone under the same conditions.) This procedure is so effective for obtaining complete reaction of titantium tetrachloride or titanium tetrabromide with a silane starting material in accordance with the present method, that even a trialkylalkoxysilane such as triethylethoxysilane, which reacts only slightly with titanium tetrachloride, reacts completely with titanium tetrachloride in the presence of sodium acetate. (The rate of reaction of a silane starting material with a titanium salt varies inversely with the size (i. e., the number of carbon atoms) of the groups attached to silicon in the molecules of the organosilane.)

Although the necessity for neutralizing a titanate produced by the present method is eliminated when the titanium salt employed is a titanium salt of a saturated fatty acid having from one to four carbon atoms (i.e., the reaction to produce the titanate can be carried to completion more readily with such a titanium salt than with titanium tetrabromide or titanium tetrachloride), it is ordinarily much more satisfactory to use titanium tetrachloride or titanium tetrabromide, initially rather than to prepare a fatty acid salt from such a halide and then react this salt with the silane starting material. Of course, a sufficient amount of an anhydrous alkali metal salt or ammonium salt of a saturated fatty acid having from one to four carbon atoms may be added initially to a mixture of the silane and titanium tetrachloride or titanium tetrabromide to form an ortho salt of titanium with the saturated fatty acid, so that essentially the reaction takes place between the organosilane and the titanium salt of the saturated fatty acid that is formed in situ during the reaction. Thus, the reaction may be carried to completion and a neutral product obtained. However, this procedure presents some difficulty in that the reaction proceeds very vigorously and is difficult to control. The reaction may be carried out by this procedure by employing a non-aqueous high boiling organic hydrocarbon solvent, such as xylene, since the dilution effect produced by the solvent helps to slow down the reaction. However, it is far more advantageous to use titanium tetrachloride, which is readily available, as the titanium salt in the present reaction and then, if the reaction does not go to completion, to employ a sufficient amount of an alkali metal or ammonium salt such as sodium or ammonium acetate to neutralize the residual chlorine, and to warm the mixture to complete the reaction. If the product is quite viscous, a solvent such as xylene may be added toward the end of the reaction. Such a solvent often aids in the filtration of the finely-divided alkali metal chloride or bromide that is formed upon neutralization when an alkali metal salt of a saturated fatty acid is used as the neutralizing agent.

The titanates produced by the reaction of three or four mols of a silane starting material per mol of titanium salt are dark, moderately viscous oils which can be partially decolorized with active carbon. Such oils are soluble in common organic hydrocarbon solvents but precipitate as white solids from oxygenated solvents such as acetone, diethyl ether, ethyl alcohol, dioxane, etc., and are readily hydrolyzed by water. These silyl titanates, however, are strongly resistant to the action of water upon application to polar surfaces.

USES

The neutralized silyl titanates of the invention produced by the present method are strongly absorbed on polar surfaces of materials such as paper and textiles. Even in very low concentrations (e.g., as low as 1.5 percent of the weight of the paper or textile material), they impart excellent water repellency without affecting the strength of the material treated.

The application of the present titanates to such materials should be made from organic solutions, since the titanates precipitate (and may hydrolyze) from aqueous systems. The procedure for rendering paper or textiles water repellent by treatment with a silyl titanate of the invention consists simply in immersing the material to be treated in a dilute organic solvent solution of the titanate (e.g., a 0.5 to 10 percent solution of the titanate in xylene, benzene or petroleum ether) and then air-drying.

For example, kraft paper dipped into a dilute (10 percent) solution of a silyl titanate of the invention and air-dried can be immersed in water for one hour and still retain about 20 percent of its dry strength. Furthermore, this increased strength, due to water repellency, is additive to the action of aminoplast wet strength resins. For example, kraft paper treated with an aminoplast wet strength resin that imparts a wet strength that is 25 to 30 percent of the dry strength, if further treated with a titanate of the invention and immersed in water for one hour, has a wet strength that is 45 to 50 percent of that of the dry paper. The water repellency imparted by the present titanates, particularly those containing long chain aliphatic hydrocarbon groups such as hexyl or higher groups, is so great that complete roll-off of water with as little as 1.5 percent of the titanate on filter paper can be observed by placing a drop of water on the treated paper held at a 45 degree angle.

Orlon, cotton and rayon dipped in solutions of the present silyl titanates and air-dried (the resin pick-up being 4 to 12 percent) have spray ratings as high as 60, or even higher (determined in accordance with Section IV (part 5) of the Supplement to Federal Specification CCC-T-191a, October 8, 1945).

Paraffin or any non-polar material deposited on paper or textiles imparts water repellency, but the adhesion of non-polar materials to paper or textiles is not permanent to solvents or boiling water. It has been found that the present titanates (particularly those containing long chain hydrocarbon groups such as hexyl or higher groups give marked adhesion of paraffin to paper in boiling water either by pre-treating the paper with the titanate before paraffin is applied or by adding the titanate directly to the paraffin and then applying to the paper in a single treatment. This is in contrast to the complete loss of strength of ordinary waxed paper when immersed in boiling water. Thus the present silyl titanates may be added to wax, asphalt, etc. as a convenient means of improving the adhesion of these non-polar materials to paper, shingles, road aggregates, etc.

The organosilicon titanates of the invention are also useful as stabilizers for clear films of plasticized or unplasticized vinyl resins such as copolymers of vinyl chloride with vinyl acetate or vinylidene chloride, i.e., vinyl resins which cannot be used without a stabilizer. Concentrations of 1 to 5 percent of the titanates in such resins result in films of the resins which are clear and have better heat stability than films containing similar amounts of heretofore used stabilizers such as basic lead stearate or basic lead ethoxy silicates.

*Example 1*

Ethyl orthosilicate (1 mol) is mixed with titanium tetrachloride (0.25 mol). The mixture rapidly turns red-amber and warms exothermally to 75 degrees C. Upon heating the mixture externally, rapid evolution of ethyl chloride occurs at a pot temperature of 110 degrees C. As the temperature approaches 170 degrees C. the evolution of the gas becomes very slow. The evolution almost ceases at 200 degrees C., and the heating is stopped, the total heating time being two hours. Titration of a sample of the residue indicates that about ⅓ of the original chlorine remains. The residue is then neutralized with sodium (8 grams) in ethyl alcohol (20 grams) and is decolorized with carbon.

The decolorized filtrate is vacuum-distilled to remove material boiling up to 160 degrees C. at 10 mm. Hg. The residue (150 grams), a viscous amber oil, is an ethoxysilyl titanate.

*Example 2*

Ethyltriethoxysilane (1 mol) is heated with titanium tetrachloride (0.25 mol) in a flask fitted with a 3-foot fractionating column. As the temperature approaches 130 degrees C., gas evolution begins. Gas evolution is rapid during two hours at 135 to 150 degrees C., is moderate during two hours at 150 to 180 degrees C. and is slow during two hours at 180 to 200 degrees C. The mixture is heated with stirring for an additional eight hours at 200 to 220 degrees C., during which time gas evolution is very slow. Titration of a sample of the residue indicates that over 95 percent of the hydrolyzable chlorine has been removed. The product is completely neutralized with sodium (1.2 grams) in ethyl alcohol (5 grams), and is decolorized with carbon. The product is then filtered. The filtrate is vacuum-distilled to remove materials boiling up to 150 degrees C. at 10 mm. Hg. The residue, a clear light amber oil, is an ethyl ethoxysilyl titanate.

*Example 3*

Sec.-butyltri-n-butoxysilane (1 mol) and titanium tetrachloride (0.25 mol) are heated together in a flask fitted with a horizontal condenser and a receiver. When the temperature of the liquid mixture is 200 degrees C., slow distillation begins, and it continues until almost the theoretical amount of distillate has been recovered (by the time the temperature of the liquid reaction mixture is 300 degrees). Although the first distillate is n-butyl chloride, a small amount of the later distillate is n-butyl ether. Titration of a sample of the residue indicates that over 95 percent of the hydrolyzable chlorine has been removed.

*Example 4*

A mixture of hexyltriethoxysilanes (1 mol) and titanium tetrachloride (0.25 mol) is heated in a flask fitted with a 3-foot fractionating column. As the temperature of the reaction mixture approaches 150 degrees C., gas evolution is observed. The mixture is heated to 200 degrees C. and is held at temperatures ranging between 200 and 220 degrees C. for ten hours. Titration of a sample of the residue indicates that about 70 percent of the hydrolyzable chlorine has been removed. The product is completely neutralized with sodium (8 grams) in ethyl alcohol (20 grams) and is decolorized with carbon. The mixture is filtered and the filtrate is vacuum-distilled to remove excess ethyl alcohol. The residue, a viscous yellow liquid, is a hexyl ethoxysilyl titanate.

*Example 5*

Lauryl triethyl orthosilicate (2 mols, prepared by heating 2 mols of ethyl orthosilicate and 2 mols of lauryl alcohol until the theoretical quantity of ethyl alcohol has been recovered) is mixed with titanium tetrachloride (½ mol), and the mixture is heated in a flask fitted with a reflux condenser. As the temperature of the reaction mixture approaches 130 to 150 degrees C., rapid gas evolution occurs. The mixture is heated to 200 to 220 degrees C. and held within this range for one hour, during which time gas evolution is very slow. Titration of a sample of the residue indicates that 50 percent of the hydrolyzable chlorine remains. The residue is neutralized with sodium (12 grams) in ethyl alcohol (30 grams), decolorized with carbon and filtered. The filtrate is a lauryloxysilyl titanate.

*Example 6*

Ethyl orthosilicate (2 mols) and titanium tetrachloride (0.5 mol) are heated together in a flask fitted with a reflux condenser. As the temperature of the mixture approaches 100 degrees C. gas evolution begins, and it becomes very rapid during fifteen minutes of heating at 140 degrees C. Heating is continued for an additional one-half hour at 175 degrees C., followed by an additional hour at 210 degrees C. The rate of gas evolution becomes very slow but the heating is then continued for six additional hours, and the reaction mixture is cooled. Titration and measurement of the cubic feet of gas evolved indicate that approximately 60 percent of the hydrolyzable chlorine has been removed. Sodium acetate (55 grams) is then added to the reaction mixture, and the heating is continued with stirring under a one-foot column packed with glass helices for two hours at temperatures ranging up to 200 degrees C. Ethyl acetate (45 cc.) distills at 70-75 degrees when the temperature of the residue is within the range between 150-200 degrees C. The residue is diluted with benzene before it is filtered. The filtrate is then concentrated by heating to obtain the ethoxysilyl titanate product (250 grams) in 50 percent benzene solution.

Silyl titanates of the invention, prepared as described in the preceding examples, are evaluated for ability to impart water repellency to paper and textiles by the following procedures.

(a) Samples of cotton cloth are dipped into 10 percent petroleum ether solutions of the titanates and then dried at 70 degrees C. The spray ratings obtained are tabulated below, the titanate used in each case being identified by the number of the example in which its preparation is described.

| Treatment: | Spray rating |
|---|---|
| None | 0 |
| Ethoxysilyl titanate (Ex. 1) | 50 |
| Ethyl ethoxysilyl titanate (Ex. 2) | 60 |
| Sec.-butyl-n-butoxysilyl titanate (Ex. 3) | 60 |

A sample of orlon treated with a 10 percent petroleum ether solution of an ethylethoxysilyl titanate (Ex. 2) and dried at 90 degrees C. has a spray rating of 70, as compared with a spray rating of 0 on untreated orlon. The silyl titanates produced by the present method are absorbed on the individual fibers and do not clog the pores of the cloth.

(b) Paper towels are dipped in solutions of the titanates and then dried in air. The spray ratings obtained are tabulated below:

| Treatment | Percent on Paper | Spray Rating |
|---|---|---|
| None | | 0 |
| Ethoxysilyl titanate (Ex. 1) | 5 | 50 |
| Do | 10 | 50 |
| Hexyl ethoxysilyl titanate (Ex. 4) | 1 | 80 |
| Do | 10 | 70 |
| Sec.-butyl-n-butoxysilyl titanate (Ex. 2) | 10 | 50 |

(c) Sheets of kraft paper are immersed in petroleum ether solutions of the titanates, and the sheets are tested for wet tensile strength with a standard pendulum-type tensile tester, the results being as follows:

| Treatment | Conc. of Titanate Soln. | Wet Tensile Strength (kg./15 mm. strip) |
|---|---|---|
| None | | 0.15 |
| Ethoxysilyl titanate | 2 | .35 |
| | 10 | .67 |
| Ethyl ethoxysilyl titanate | 10 | 1.17 |
| Hexyl ethoxysilyl titanate | 2 | .30 |
| | 10 | 1.12 |
| Ethyltriethoxy silane | 10 | .20 |

Hexyl and ethyl ethoxysilyl titanates are extremely effective in imparting wet tensile strength to kraft paper, whereas ethyltriethoxysilane is completely ineffective.

Sheets of kraft paper treated with an aminoplast wet strength resin are immersed in 10 percent dioxane solutions of silyl titanates, and the sheets are tested for wet tensile strength, the results being tabulated below:

| Treatment | Percent Resin (pick-up) | Wet Tensile Strength (kg./15 mm. strip) |
|---|---|---|
| None | | 2.58 |
| Ethoxysilyl titanate | 10 | 3.5 |
| Ethyl ethoxysilyl titanate | 7 | 3.3 |

The increased wet tensile strength imparted to paper by the water repellent effect of silyl titanates of the invention is additive to the action of aminoplast wet strength resins.

The usefulness of a silyl titanate of the invention as an antistripping additive to asphalt cement (i.e., in improving the adhesion of asphalt to road aggregate) is tested as follows in accordance with the Ohio Dept. of Highways Specification 205.1:

Crushed stone (100 grams) fine enough to pass through a ⅜ inch screen but not through a ¼ inch screen is warmed in a beaker for one-half at 135 degrees C. The warmed stone is then mixed for three minutes with warmed asphalt (5 grams), using a spatula. The mixture is spread on a glass plate (the layer being approximately the thickness of one stone) and the plate is immersed in water at 82 degrees C. At the end of one-half hour and at the end of one hour the plate is examined to determine how much stripping (as evidenced by white spots) takes place.

The procedure described in the preceding paragraph is repeated except that the asphalt (4.95 grams) is melted and mixed with a silyl titanate of the invention (0.05 gram of the ethyl ethoxysilyl titanate prepared as described in Example 2) and cooled slightly before it is mixed with the stone.

The stone treated with asphalt containing no additive shows stripping in 25 percent of its area in one-half hour and in 100 percent of its area in one hour, whereas the stone treated with the asphalt containing the titanate shows stripping in only 2 percent of its area in one-half hour and in only 4 percent of its area in one hour.

The usefulness of a silyl titante as a stabilizer in a vinyl resin is tested as follows:

Samples of a methylethyl ketone solution of a vinyl resin (a copolymer of 90 percent vinyl chloride and 10 percent vinyl acetate) comprising 1, 3 and 5 percent of an ethyl ethoxysilyl titanate (Ex. 2), respectively, are filmed on glass plates which then are held at 320 degrees F. for 72 hours in a force-draft oven (test 1). The films are then examined for discoloration and are rated 0 for colorless and 1, 2, 3, 4 or 5 for increasing discoloration, from pale yellow to deep amber. Similar tests (test 2) are made on films of the same vinyl resin containing 25 percent of dioctyl phthalate as a plasticizer, some of these films being baked in a 300 degree Fahrenheit oven for 24 hours and others in a 300 degree oven for 72 hours. Other unplasticized films containing various percentages of the titanate additive are placed in a 400 degree Fahrenheit oven for forty-five minutes (test 3). The latter films are rated on percent of area maintaining adhesion to glass after heating. The ratings of these tests are tabulated below.

| Test | Percent of silyl titanate additive | | | | |
|---|---|---|---|---|---|
| | 0 | 0.5 | 1.0 | 3.0 | 5.0 |
| | Ratings | | | | |
| 1 | 3 | | 2 | 1 | 1 |
| 2 (24 hrs.) | 2 | | 1 | 1 | 1 |
| 2 (72 hrs.) | 3 | | 2 | 2 | 1 |
| 3 | 70% | [1] 100% | [1] 100% | [1] 100% | |

[1] Films are smooth and continuous with no wrinkling.

*Example 7*

An ethylethoxysiloxane is prepared as follows: Ethyltriethoxysilane (192 grams) is mixed with one pellet of sodium hydroxide in a 2 liter three-necked flask fitted with a stirrer, a reflux condenser and a dropping funnel and is heated to reflux. A mixture of ethanol (10 cc.) and water (21.2 grams) is placed in the dropping funnel and is slowly run into the solution in the flask. The mixture in the flask is stirred during the addition, and the refluxing is continued for four hours after the addition is complete. The mixture in the flask is then transferred to a Claisen distillation apparatus and is distilled at atmospheric pressure to remove excess ethanol. The residue is a silicone of viscosity P (Gardner-Holdt).

An ethylethoxysiloxane (200 grams of the siloxane prepared as described in the preceding paragraph) in xylene (100 cc.) is mixed with titanium tetrachloride (10 grams; and anhydrous sodium acetate (20 grams).

The mixture is heated with stirring to a temperature of 140 degrees C., ethyl acetate (25 cc.) being distilled in the temperature range between 60 and 80 degrees C. Titration of a sample of the residue indicates that 75 per cent of the acidic chlorine has been reacted. To the cooled residue is added potassium diethoxyethyl silicate (KOSi(Et)(OET)$_2$, 5 grams, prepared by warming 56 grams of anhydrous potassium hydroxide with 192 grams of ethyltriethoxysilane until the theoretical amount of ethyl alcohol has been recovered) dissolved in xylene (50 cc.), and the resulting mixture is refluxed for two hours. The mixture is filtered to obtain a neutral pale yellow xylene solution of a titanated ethylsilicone.

A circle of filter paper dipped into a 1 percent xylene solution of the titanate prepared as described in the preceding paragraph and air-dried is tested for water repellency by flowing a drop of water down the paper held at a 45 degree angle. The drop rolls off completely. A circle of filter paper dipped into a 1 percent xylene solution of the ethylethoxysiloxane, before it is titanated, and air-dried, shows substantially no repellency to water.

Having described the invention, I claim:

1. A method of producing titanates that comprises reacting metathetically, under substantially anhydrous conditions (1) from one to four mols of a substance selected from the group consisting of silanes having one of the general formulae (a) $H_wR_xSiOr_{(4-(x+w))}$ (b) 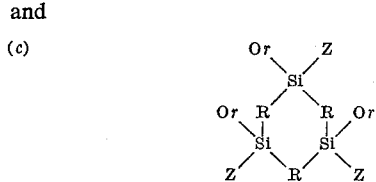

and (c) 

mixtures of said silanes, and organosiloxanes having the empirical formula (d) $RSi(Or)_mO_{\left(\frac{3-m}{2}\right)}$ wherein the groups R are hydrocarbon groups selected from the class consisting of monovalent alkyl groups having from 1 to 18 carbon atoms, monovalent alkenyl groups having from 2 to 18 carbon atoms and having not more than one olefinic double bond, monovalent cycloalkyl groups which consist of a single cycloaliphatic nucleus containing from 5 to 6 carbon atoms and having not more than three side chains containing a total of not more than 6 carbon atoms, monovalent aromatic groups having from 6 to 18 carbon atoms, divalent alkylidene groups having from 1 to 18 carbon atoms, divalent closed chain saturated alkylidene groups having from 5 to 18 carbon atoms, and divalent aromatic groups having from 6 to 18 carbon atoms; the groups $r$ are selected from the class consisting of said monovalent alkyl, alkenyl and cycloalkyl groups stated for such hydrocarbon groups R; $w$ is a number of group consisting of 0 and 1, $x$ is a number of the group consisting of 0 and the integers from 1 to 3, the sum of $x$ plus $w$ is not greater than 3, $z$ is an integer from 1 to 2, Z is a monovalent group of the same class as R and Or, and m is a number from ⅓ to 2; with (2) one mole of a titanium salt of an acid of the class consisting of hydrochloric acid, hydrobromic acid and saturated fatty acids having from one to four carbon atoms.

2. A method of producing titanates that comprises reacting metathetically, under substantially anhydrous conditions (1) from one to four mols of a substance selected from the group consisting of silanes having one of the general formulae (a) $H_wR_xSiOr_{(4-(x+w))}$ (b) 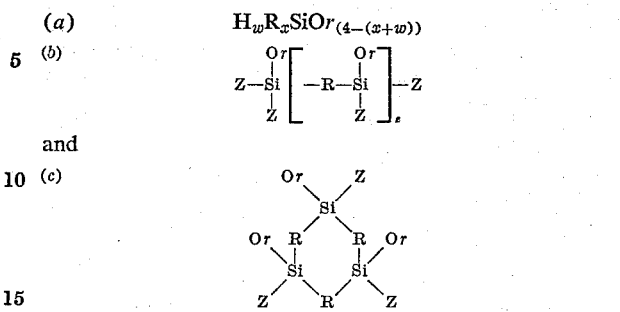

and (c) 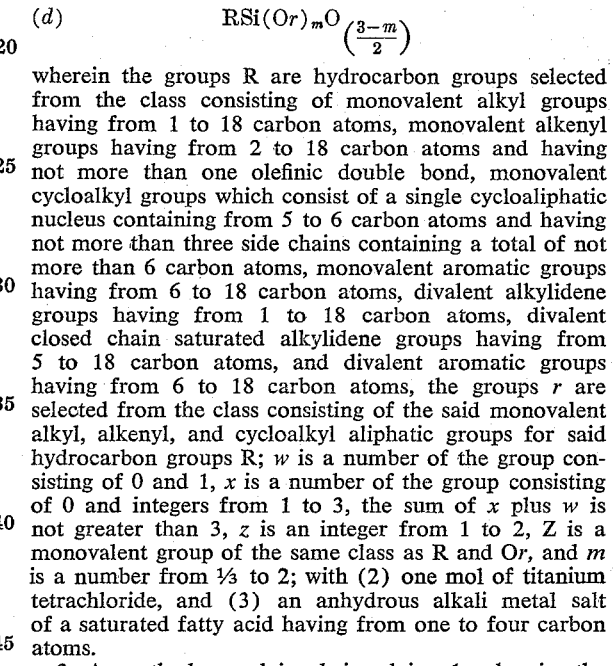

mixtures of said silanes, and organosiloxanes having the empirical formula (d) $RSi(Or)_mO_{\left(\frac{3-m}{2}\right)}$ wherein the groups R are hydrocarbon groups selected from the class consisting of monovalent alkyl groups having from 1 to 18 carbon atoms, monovalent alkenyl groups having from 2 to 18 carbon atoms and having not more than one olefinic double bond, monovalent cycloalkyl groups which consist of a single cycloaliphatic nucleus containing from 5 to 6 carbon atoms and having not more than three side chains containing a total of not more than 6 carbon atoms, monovalent aromatic groups having from 6 to 18 carbon atoms, divalent alkylidene groups having from 1 to 18 carbon atoms, divalent closed chain saturated alkylidene groups having from 5 to 18 carbon atoms, and divalent aromatic groups having from 6 to 18 carbon atoms, the groups $r$ are selected from the class consisting of the said monovalent alkyl, alkenyl, and cycloalkyl aliphatic groups for said hydrocarbon groups R; $w$ is a number of the group consisting of 0 and 1, $x$ is a number of the group consisting of 0 and integers from 1 to 3, the sum of $x$ plus $w$ is not greater than 3, $z$ is an integer from 1 to 2, Z is a monovalent group of the same class as R and Or, and m is a number from ⅓ to 2; with (2) one mol of titanium tetrachloride, and (3) an anhydrous alkali metal salt of a saturated fatty acid having from one to four carbon atoms.

3. A method as claimed in claim 1 wherein the titanium salt is titanium tetrachloride.

4. A method as claimed in claim 1 wherein from three to four mols of the first-mentioned substance are reacted with each mol of the titanium salt.

5. A method as claimed in claim 4 wherein the titanium salt is titanium tetrachloride.

6. A titanate having an evarage unit structure corresponding to the formula $TiSi_nR_x[Or]_vO_{\left(\frac{4+4n-(vx+y)}{2}\right)}$ wherein $n$ is at least 1; $v$ is the average valence of the groups R; $vx$ is from 0 to $2n$; $y$ is from $n$ to $3n$; the sum of $vx$ and $y$ is not greater than $3n$; the groups R are hydrocarbon groups each connected to a silicon atom through a carbon-silicon bond, said hydrocarbon groups being selected from the class consisting of monovalent alkyl groups having from 1 to 18 carbon atoms, monovalent alkenyl groups having from 2 to 18 carbon atoms and having not more than one olefinic double bond, monovalent cycloalkyl groups which consist of a single cycloaliphatic nucleus containing from 5 to 6 carbon atoms and having not more than 3 side chains containing a total of not more than 6 carbon atoms, monovalent aromatic groups having from 6 to 18 carbon atoms, divalent alkylidene groups having from 1 to 18 carbon atoms, divalent closed chain saturated alkylidene groups having from 5 to 18 carbon atoms, and divalent aromatic groups having from 6 to 18 carbon atoms; the groups $r$ are aliphatic hydrocarbon groups, said groups $r$ being selected from the class consisting of said monovalent alkyl, alkenyl and cycloalkyl monovalent groups for said hydrocarbon groups R; at least part of the O$r$ groups are attached to silicon atoms; the valences of titanium are satisfied only by oxygen atoms; and at least one silicon atom is connected to one of said oxygen atoms.

7. A substance as claimed in claim 6 wherein $x$ is at least equal to $n$.

8. A substance as claimed in claim 6 wherein $n$ is from 3 to 4.

9. A titanate having an average unit structure corresponding to the formula $$TiO_4Si_nR_x[Or]_{4n-(4+x)}$$

wherein $n$ is from 3 to 4; $x$ is from 0 to $n$; the groups R are monovalent hydrocarbon groups each connected to a silicon atom through a carbon-silicon bond, said hydrocarbon groups being selected from the class consisting of monovalent alkyl groups having from 1 to 18 carbon atoms, monovalent alkenyl groups having from 2 to 18 carbon atoms and having not more than one olefinic double bond, monovalent cycloalkyl groups which consist of a single cycloaliphatic nucleus containing from 5 to 6 carbon atoms and having not more than 3 side chains containing a total of not more than 6 carbon atoms, monovalent aromatic groups having from 6 to 18 carbon atoms, divalent alkylidene groups having from 1 to 18 carbon atoms, divalent closed chain saturated alkylidene groups having from 5 to 18 carbon atoms, and divalent aromatic groups having from 6 to 18 carbon atoms; the groups $r$ are aliphatic hydrocarbon groups, said groups $r$ being selected from the class consisting of said monovalent alkyl, alkenyl and cycloalkyl monovalent groups for said hydrocarbon groups R; all the O$r$ groups are attached to silicon atoms; the valences of titanium are satisfied only by oxygen atoms; and at least one silicon atom is connected to one of said oxygen atoms.

10. A substance as claimed in claim 9 wherein $x$ is equal to $n$.

References Cited in the file of this patent
UNITED STATES PATENTS

| | | |
|---|---|---|
| 2,512,058 | Gulledge | June 20, 1950 |
| 2,716,656 | Boyd | Aug. 30, 1955 |
| 2,774,690 | Cockett et al. | Dec. 18, 1956 |